United States Patent
Schelling et al.

(12) 
(10) Patent No.: US 6,270,854 B1
(45) Date of Patent: Aug. 7, 2001

(54) ELECTROSTATIC COATING POWDER FOR GLASS, CERAMIC OR METALLIC SUBSTRATES

(75) Inventors: Volker Schelling, Linsengericht; Andreas Schriener, Bad Homburg; Herbert Triptrap, Frankfurt, all of (DE)

(73) Assignee: dmc² Degussa Metals Catalysts Cerdec AG, Frankfurt (DE)

( * ) Notice: Subject to any disclaimer, the term of this patent is extended or adjusted under 35 U.S.C. 154(b) by 0 days.

(21) Appl. No.: 09/424,640

(22) PCT Filed: May 6, 1998

(86) PCT No.: PCT/EP98/02659

§ 371 Date: Jan. 5, 2000

§ 102(e) Date: Jan. 5, 2000

(87) PCT Pub. No.: WO98/54105

PCT Pub. Date: Dec. 3, 1998

(30) Foreign Application Priority Data

May 28, 1997 (DE) .................................................. 19722273

(51) Int. Cl.⁷ ........................................................ B05D 1/06
(52) U.S. Cl. .............................. 427/475; 427/486; 501/1; 361/226

(58) Field of Search ..................................... 427/475–481, 427/485, 486; 361/226, 227; 501/1

(56) References Cited

U.S. PATENT DOCUMENTS 4,908,225 * 3/1990 Niimura et al. .

FOREIGN PATENT DOCUMENTS

| 43 08 789 | 10/1993 | (DE) . |
| 0 382 003 | 8/1990 | (EP) . |
| 94 26679 | 11/1994 | (WO) . |
| 94/26679 * | 11/1994 | (WO) . |
| 97 08115 | 3/1997 | (WO) . |
| 97/08115 * | 3/1997 | (WO) . |

* cited by examiner

Primary Examiner—Fred J. Parker
(74) Attorney, Agent, or Firm—Wenderoth, Lind & Ponack, L.L.P.

(57) ABSTRACT

An electrostatically applicable coating powder is provided which contains a first powder which forms a glass layer upon firing, and 0.01 to 1% by weight of a salt of a carboxylic acid. The coating powder is free of organosiloxane and preferably contains a chemically or thermally activatable resin. The invention also provides methods for preparing the coating powder and methods for coating glass, ceramic or metal substrates with the powder.

23 Claims, No Drawings

ELECTROSTATIC COATING POWDER FOR GLASS, CERAMIC OR METALLIC SUBSTRATES

BACKGROUND OF THE INVENTION

1. Field of the Invention

The invention is directed toward a coating power for the electrostatic coating of glass as well as ceramic and metallic substrates; the main component of the coating powder is a powder-form material which forms a glass layer during firing. A further subject matter of the invention is directed toward a process for the production of the coating powder. A further subject matter of the invention relates to the use of the coating powder for glazing, slip painting and decorating glass and ceramiG'substrates as well as for enameling metallic substrates.

2. Description of Related Art

Among the materials for producing ceramic coatings, such as glazes, enamels and vitreous enamels on substrates capable of being fired, are understood to be glass as well as ceramic and metallic substrates, aqueous slips are largely used; following the application of the slip, the substrate coated with the slip is fired, in the process of which the material, capable of being fired in and comprised in the slip, melts together or is sintered to form a vitreous layer often also referred to as ceramic layer. Due to the disadvantages entailed in the use of aqueous slips, such as problems involving effluents and high energy requirements, the electrostatic powder coating gains in importance.

It is known that coating powders forming a vitreous layer during firing, can be sprayed electrostatically onto glass as well as ceramic and metallic surfaces. The electrostatically applicable coating powders must have a sufficiently high electric volume resistivity, customarily $10^9$ to $10^{14}$ $\Omega \cdot m$. In order to attain the required resistivity value, the coating powders are coated with insulating substances, such as for example silanols and organopolysiloxanes, isocyanates and carbodiimides. By treating ceramic powders with polymethylhydrogensiloxanes, according to EP-A 0 382 003, apart from the required resistivity value, the adhesion of the powder on the ceramic surface can simultaneously be improved. Of disadvantage is that the production process for ceramic powders treated thus entails high expenditures.

WO 94/26679 teaches improving the adhesion and fastness to handling of an electrostatically applied glazing powder: in addition to a glazing powder, the coating powder in this case comprises an adhesion means which during the firing burns free of residues, such as polyolefins or dextrins which are activated thermally, respectively by moisture, in order to fix the particles of the layer with one another and with the substrate. Preferred coating powders comprise polysiloxane-coated glass frits in mixtures with 10 to 15 percent by weight of thermoplastic materials or 5 to 10 percent by weight of dextrin. Only under especially optimized conditions, which, however, lead to high expenditures, is it possible to obtain usable glazes on porcelain biscuit bodies. To some extent considerable glazing errors and faults occur already under slightly modified conditions as a function of the substrate before the required layer thickness is reached.

An improvement of said problems is taught by WO 97/08115 when using a glazing or slip painting composition with a specific distribution of particle size, namely a $d_{50}$ value of 5 to 25 $\mu m$, a $d_{90}$ value of less than 35 $\mu m$ and a $d_{10}$ value equal to or greater than 2 $\mu m$, in a coating powder comprising additionally an adhesion means, it is possible to simplify the production process without loss of quality of the glaze.

WO 97/08115 also discloses that in the presence of an organopolysiloxane the electric resistivity of the coating powder increases in the desired way with increasing quantity of the adhesion means. Above a specific quantity of adhesion means, however, spray-back effects occur such that the required layer thickness can no longer be applied so that the fired-in layer is too thin and accordingly has flaws.

One problem of electrostatic coating of glass and ceramic substrates comprises also that the coating powders have highly differing volume resistivities as a function of their composition and their range of particle size. Added to this is the fact that the substrates to be coated have a highly varying surface conductivity which, additionally, depend on the climate conditions in the coating chamber. Fault-free electrostatic coating presupposes that the volume resistivity of the coating power is matched to the substrate to be coated and to the climate conditions. While previously the highest volume resistivity possible of the coating powder was demanded, it has been found in the meantime that very high resistivity values are indeed useful with low layer thickness, for example with thicknesses of 10 to 80 $\mu m$, conventional for glass decorations, however, that with higher layer thicknesses, for example 100 to 400 $\mu m$, such as are demanded for glazes for tiles, spray-back effects develop due to too high a resistivity.

SUMMARY OF THE INVENTION

Accordingly, the task of the present invention is to show a new path for adjusting the volume resistivity of a coating powder in simple manner such that it can be electrostatically applied without encountering any problems and leads to fault-free fired-in coatings.

It has been found that salts of carboxylic acids can be used as effective auxiliary substances for increasing the volume resistivity of coating powders. By adding a very small quantity of a carboxylic acid salt, for example 0.05 percent by weight of magnesium acetate, it is already possible to increase the volume resistivity of a glazing powder by 2 to 3 powers of ten.

Subject matter of the invention, accordingly, is a coating powder for the electrostatic coating of glass as well as ceramic and metallic substrates, comprising a powder-form material which forms a vitreous layer during firing, which is characterized thereby that it comprises a salt of a carboxylic acid in a quantity of 0.01 to 1 percent by weight.

DETAILED DESCRIPTION OF THE INVENTION

The carboxylic acid salts are based on an aliphatic or aromatic carboxylic acid with one or several carboxyl groups and, if appropriate, additionally other functional groups, such as hydroxyl groups. Preferred are aliphatic carboxylic acids with 1 to 6 carbon atoms and 1 to 2 carboxyl groups and, if appropriate, 1 or 2 other functional groups. Especially suitable are lower aliphatic monocarboxylic acids, in particular acetic acid and proprionic acid.

The choice of the cation of the carboxylic acid salt comprises metals of the principal and auxiliary groups of the period system of elements. These are preferably alkali metal, alkaline earth metal or earth metal cations, especially preferably $Li^+$, $Na^+$, $K^+$, $Mg^{2+}$, $Ca^{2+}$ and $Al^{3+}$.

Adding a very small quantity of carboxylic acid salt already increases the resistivity of the coating powder. Although already a quantity below 0.01 percent by weight has an effect, the quantity used in practice is around and especially above 0.01 percent by weight. The quantity used is usefully in the range of 0.01 to 1 percent by weight. While a quantity used of more than 1 percent by weight is possible, no further increase of the electric resistivity does occur in this case. Preferably 0.05 to 0.5 percent by weight of carboxylic acid salt, in particular an alkali, alkaline earth or earth metal acetate or proprionate are used.

For an optimum increase of the resistivity the carboxylic acid salt must be homogeneously distributed in the coating powder. Such a distribution can be attained in simple manner through intensive dry mixing, in particular using an intensive mixer. Alternatively, the vitreous layer-forming powder-form material can be brought into contact with an aqueous solution or suspension of a carboxylic acid salt, for example within the scope of a grinding process, whereupon the moist product is dried and, if required, further sifted.

It is entirely surprising that carboxylic acid salts have the capability of increasing significantly the electric volume resistivity of coating powders, namely by several powers of ten, most frequently 3 to 5 powers of ten. Thus, resistivity values are obtained such as are required for electrostatic application. While, for example, untreated glazing powders most often have an electric volume resistivity in the range of $10^6$ to $10^7$ $\Omega \cdot m$, by adding 0.1 to 0.3 percent by weight of an acetate, resistivity values in the range of $10^{10}$ to $10^{12}$ $\Omega \cdot m$ are achieved. Treatment with organopolysiloxanes for increasing resistivity thus, as a rule, is no longer required, however, it is not excluded if a resistivity above that obtainable with the carboxylic acid salt is required.

Through the presence of a carboxylic acid salt in the coating powder, apparently electrical charges are held better by the powder particles such that they orient themselves better in the electric field toward the grounded workpiece during the spraying. This makes not only the powder electrostatically applicable but, in addition, the adhesion of the powder on the substrate increases such that substrates coated thus can be directly fired.

In order to obtain coatings with further increased adhesion and fastness to handling, it may be advisable to make additionally use of the technical teaching of WO 94/26679 and/or WO 97/08115:

According to WO 94/26679 the coating powder according to the invention can additionally comprise in effective quantities a powder-form adhesion means which is physically, in particular thermally, namely by melting and solidification, or chemically activatable. Thermally activatable adhesion means are in particular thermoplastic materials, such as polyethylene, whose bonding effect is attained through melting with subsequent solidification. For the purpose of melting, the substrate to be coated is heated before and/or after the coating to a temperature above the melting point of the thermoplastic material. Among the chemically activatable adhesion means are two-component resin systems, such as the combinations of epoxy resin and curing agent, as well as the combinations of isocyanate and curing agent. The quantity of adhesion means is most often in the range of 1 to 20 percent by weight, relative to the coating powder, but in particular 1 to 10 percent by weight. In known manner, the adhesion means is introduced into the coating powder in the dry state of the carboxylic acid salt before, during or after the addition. In this case the intensive mixing below the activation temperature of the adhesion means is also useful in order to ensure homogeneous distribution, and thus the fault-free coating before and after the firing.

According to WO 97/08115 the adhesive strength can also be improved through the use of a powder-form material, forming a vitreous layer during firing, with a specific range of particle size, in particular $d_{50}$ 5 to 25 $\mu m$, $d_{90}$ less than 35 $\mu m$, and $d_{10}$ equal to or greater than 2 $\mu m$. Before or after the addition of the carboxylic acid salt to the powder-form material, it should be ground and/or sifted. As discussed above in connection with the adhesion means, it is in many cases also advantageous to heat the substrate to be coated before the electrostatic coating. The temperature and length of time depends on the substrate. Preheating, in particular in the case of fired or biscuit-fired bodies as well as glass, is useful.

The materials forming during the firing a vitreous layer, are substantially glazing, slip painting, vitreous enamel, and decoration powder as well as enamel powder. These substances can substantially be homogenous substances, for example glass frits or mixtures of glass frits and, if appropriate, additionally substances from the group alum earth, wollastonite, zirconium silicate and white or colored pigments; vitreous enamel powder comprising substantially one or several glass frits or so-called fluxing agents and pigments; slip paints, comprising, in addition to glass frits, substances from the group fine-particle raw ceramic substances, ground minerals, glass and porcelain powder, opacifying agents and pigments. In the case of substance mixtures it can be advantageous to use them in the form of so-called spray granulates in order to avoid dissociation and to obtain homogeneous behavior during melting. The vitreous layer-forming materials are preferably already present in the coating powder at 30 to 100 percent by weight, in particular at more than 50 percent by weight in the fritted state.

The electrostatically coated substrates are fired directly or after further decoration of the surface, for example comprising fixing of the layer using a polymer fixative and decoration using transfer decals or by means of screen printing. Temperature and length of firing depend on the substrate and the type of coating powder. The firing can for example be a typical decoration firing or a single rapid firing with the unfired substrate and the applied coating being fired simultaneously.

Apart from the previously listed additives in the electrostatically applicable coating powders, they can also comprise conventional fluidization means, such as pyrogenic oxides, for example $SiO_2$, $Al_2O_3$, $TiO_2$, $ZrO_2$ in effective quantities, for example 0.05 to 3 percent by weight, in particular 0.1 to 0.5 percent by weight, which improves the electrostatic spraying of the powder.

The coating powder according to the invention can be used for glazing, slip painting, enameling and decorating of fired and unfired ceramic substrates and glass as well as for enameling of metals. The use comprises the electrostatic coating under known conditions and firing of the substrate.

A special use of the coating powder according to the invention is directed toward the production of glass decorations, in particular etching imitations or colored high-gloss decorations, which are provided with additional decoration, such as lettering. Within the scope of prior art such decorations, for example etching imitations with additional decoration were generated using polymer systems which required two firing processes. As has also been found, alternatively to the use of said systems according to the invention, thus coating powders with a carboxylic acid salt, such decorations can also be obtained using other electrostatically applicable coating powders whose volume resistivity is sufficiently high, for example such comprising polysiloxanes. For the production of such decorations an electrostatically applicable coating powder, in particular one having a $d_{50}$ value below 10 µm and an electric volume resistivity above $10^{10}$ Ω·m, preferably $10^{12}$ to $10^{14}$ Ω·m, is sprayed electrostatically in such quantities onto preheated glass (100 to 250° C.) that the layer thickness after the firing-in is 10 to 50 µm. The coating can be fixed in known manner by being sprayed by means of a polymer dispersion. Onto the fixed layer, in known manner, for example by means of screen printing or transfer decal technique, a decoration can be applied. This is followed by the firing with the primary decoration, for example the etching imitation, and the additional decoration are fired in. To obtain an etching effect, the coating powder comprises an opacifying agent, such as $SiO_2$, $ZrSiO_4$, $TiO_2$, $ZrO_2$ and spinel, or multiphase glass systems. If required, the coating powder comprises a carboxylic acid salt or/and an organopolysiloxane and/or an organic adhesion means and/or a fluidization means which itself can have the function of opacifying agent, each in an effective quantity. The $d_{50}$ value of the powder is preferably around/under 5 µm and the $d_{90}$ value below the value of the fired-in layer.

An explanation of the resistivity-increasing effect of the carboxylic acid salt is not known at this time. Based on the ionic character of the carboxylic acid salt, a lowering of the resistivity would have had to be expected rather than the increase according to the invention. Other salts, such as sulfates, phosphates and chlorides do not exhibit the effect according to the invention—see comparison experiments. It was also surprising that salts of short-chain aliphatic carboxylic acids to which, in comparison to salts of long-chain carboxylic acids, no hydrophobing effect can be assigned per se, have proven to be especially effective. A further advantage of the salts of short-chain aliphatic carboxylic acids is, further, their ready accessibility, good solubility in water and thus good dispersibility in the coating powder. The coating powders according to the invention are simple of production, and the electric volume resistivity can reliably be adjusted as a function of the quantity used. Further advantages are good adhesion on the substrate as well as the possibility to dispense with the use of organopolysiloxanes and/or adhesion means or to reduce the quantity used of these substances. The carboxylic acid salts in the coating powder also do not result in any faults in the fired-in coating.

A further advantage of the coating powders according to the invention which comprises, additionally an adhesion means with high electric volume resistivity comprises that during the electric coating no electrostically-conditioned dissociation occurs which in the past could have resulted in the fact that the coated substrate comprised a higher fraction of adhesion means than the powder which did not impinge on the substrate during the spraying. Dissociation is apparently avoided since the electric volume resistivity of the glass-forming material is similar to that of the adhesion means. Repeated adjustments of the adhesion means content thus becomes superfluous when using the powder according to the invention.

A further advantage of the coating powder according to the invention comprises that the covering of active centers of the glass-forming material with a carboxylic acid salt improves fluidizability. Therewith, the addition of different fluidization means can be dispensed with and turbidity phenomena of a fired-in coating on glass are avoided.

The invention will be explained in further detail in conjunction with the following examples and comparison examples.

General Instructions a) Production of the Coating Powder:

500 g glass frit were ground for 25 minutes with x % carboxylic acid salt in 200 ml water in a Bloch-Rosetti mill. Drying took place at 110° C.; the mixture was subsequently ground in the dry state for 5 minutes, and, if specified, sifted.

b) Production of the Coating Powder Comprising an Adhesion Means:

A frit without carboxylic acid salt, respectively a frit with carboxylic acid salt-produced according to a)—was thoroughly mixed with the adhesion means thereby that the particular raw mixture was being homogenized using an intensive mixing device. As adhesion means was used in each instance polyethylene wax with a softening temperature of 135° C. and a range of particle size of $d_{10}$ of 1.8 µm, $d_{50}$ of 10.5 µm, and $d_{90}$ of 16.9 µm.

c) Determination of the Electric Volume Resistivity of the Coating Powder:

measuring methods and instruments according to DIN IEC 93:
cylindrical measuring cell with guard ring electrode;
distance of the electrodes 5 mm; high-ohmic resistance measuring instrument of type Teralog 6202 (STATRON);
selected measuring voltage $U_M$=1 V up to a volume resistivity =$10^6$ Ω·m, 10 V up to $10^7$ Ω·m;
$U_M$=1000 V in the case of powders having a volume resistivity >$10^9$ Ω·m.

The measuring voltage was always connected 1 minute after filling the powder sample into the measuring cell (in order to ensure constant and reproducible powder densities in the intermediate electrode volume). The measured values were read off 1 minute after the measuring voltage had been switched on.

d) Electrostatic Coating:

Biscuit-fired porcelain bodies (15×15 cm) were coated without preheating them. High-voltage pistol with slot nozzle; 70 kV at 60 µA.

e) Determination of the Adhesive Strength of the Electrostatically Applied Coating Powder:

the electrostatically coated body is placed upside down (coated side down) and fixed in a holder provided for this purpose. From a defined height (h=70 cm) a hard-rubber sphere (m=0.005 kg) is dropped centrally onto the substrate. An electrostatically well charged powder continues to adhere after the drop test on the ceramic body. The powder fixed on the substrate after the drop test is placed into relationship to the original total powder application. The adhesive strength of the glazing powder is obtained in percentage.

EXAMPLE 1

For the production of a glaze coating powder for tiles a glass frit was used—TGF 2486 A by Cerdec AG, comprising as the main components $SiO_2$, ZnO, $B_2O_3$, $Al_2O_3$, MgO, CaO, $K_2O$ and $ZrO_2$ (Sample 1.1).

Analogous to the general instruction a), however on a 150-fold scale, a grinding length of 75 minutes in a ball-[drum] mill and cylinder drying, the frit was covered with 0.2 percent by weight of magnesium acetate (Sample 1.2); Sample 1.1 corresponds to the frit treated in the same way in the absence of magnesium acetate.

Sample 1.2 was Sifted (Sample 1.3).

Table 1 shows the electric volume resistivity as well as the range of particle size of the sample.

TABLE 1

| Sample Number | Electr. Volume Resistivity (Ohms · meters) | Range of Particle Size | | |
|---|---|---|---|---|
| | | $d_{10}$ (μm) | $d_{50}$ (μm) | $d_{90}$ (μm) |
| 1.1 | $5 \cdot 10^8$ | 2.6 | 24.0 | 66.5 |
| 1.2 | $5 \cdot 10^{12}$ | 2.5 | 23.8 | 66.0 |
| 1.3 | $3 \cdot 10^{13}$ | 4.2 | 19.5 | 43.7 |

The tests show that the addition of 0.2 percent by weight of Mg-acetate already increases the resistivity by 4 powers of ten. A further increase is possible by sifting the powder.

EXAMPLE 2

The coating powders 1.1 and 1.2 of Example 1 as well as coating powders 1.1 H and 1.2 H comprising polyethylene wax as adhesion means were electrostatically applied on biscuit-fired porcelain bodies according to general instruction d) and the coated bodies were subsequently fired. The production of samples 1.1 H and 1.2 H was carried out according to general instruction b) with the quantity of adhesion means in each instance being 6 percent by weight relative to the coating powder. The adhesive strength was determined in percentage (mean value of 5 measurements) according to general instruction e) as well as the quantity applied per 60 seconds (mean value of 5 measurements) and, in addition, the electric volume resistivity according to general instruction c), further the surface quality of the glaze fired-in over a period of 60 minutes at 1170° C. The results are compiled in Table 2.

TABLE 2

| Sample Number | Electr. Volume Resistivity (Ω · m) | Adhesive Strength (%) | Quantity Applied (g/min) | Quality of Glaze |
|---|---|---|---|---|
| 1.1 | $5 \cdot 10^8$ | 5.2 | 2.4 | n.d. (*) |
| 1.2 | $5 \cdot 10^{12}$ | 81.5 | 15.5 | good (**) |
| 1.1H | $7 \cdot 10^{12}$ | 82.9 | 15.0 | good (**) |
| 1.2H | $5 \cdot 10^{13}$ | 84.0 | 15.1 | good (**) |

*) n.d. = not determined since the sample was not fired due to insufficient powder application
**) good = smooth and quiet surface; no needle pricks, no orange skin effect; no crawlers (bubbles, unglazed places).

The tests show that the addition of 0.2 percent by weight of magnesium acetate to a glaze powder increases the adhesive strength in the same way as the addition of 6 percent by weight of polyethylene wax.

EXAMPLE 3

A glass frit (TGF 2486 A by Cerdec AG) was covered according to general instruction a) with differing quantities of magnesium acetate. Sample 3.0 corresponds to the frit treated according to a) in the absence of magnesium acetate; range of particle size of 3.0: $d_{10}$ [equals] 1.2 μm, $d_{50}$ 8.6 μm, $d_{90}$ 34.9 μm. As Table 3 shows, the electric volume resistivity of the coating powder increases strongly with increasing quantities of Mg acetate.

TABLE 3

| Sample Number | Magnesium Acetate (percent by weight) | Electr. Volume Resistivity (Ohms · meters) |
|---|---|---|
| 3.0 | 0 | $<10^7$ |
| 3.1 | 0.05 | $1 \cdot 10^9$ |

TABLE 3-continued

| Sample Number | Magnesium Acetate (percent by weight) | Electr. Volume Resistivity (Ohms · meters) |
|---|---|---|
| 3.2 | 0.10 | $2 \cdot 10^{11}$ |
| 3.3 | 0.25 | $1 \cdot 10^{12}$ |

EXAMPLE 4

Analogous to Example 3, according to general instruction a) different salts were applied on the, in each instance, identical glass frits (290/498 by Cerdec AG), and specifically in a quantity of 0.2 percent by weight. Table 4 shows the electric volume resistivity of the different powders. Powder No. 4.0 does not contain any salt and powders No. 4.1 to 4.8 conform to the invention. Powders No. 4.9 to 4.11 comprise salts other than carboxylic acid salts (not according to the invention) which leads to no or only a very slight increase of the resistivity.

| Sample Number | Salt | Electr. Volume Resistivity (Ohms · meters) |
|---|---|---|
| 4.0 | — | $<10^7$ |
| 4.1 | Mg acetate | $5 \cdot 10^{11}$ |
| 4.2 | Ca acetate | $2 \cdot 10^{11}$ |
| 4.3 | Mg acetate | $2 \cdot 10^{11}$ |
| 4.4 | Zn acetate | $6 \cdot 10^{11}$ |
| 4.5 | Na acetate | $1 \cdot 10^{11}$ |
| 4.6 | K acetate | $5 \cdot 10^{10}$ |
| 4.7 | Al acetate | $4 \cdot 10^{10}$ |
| 4.8 | La(III) acetate hydrate | $3 \cdot 10^{11}$ |
| 4.9 | $MgSo_4 \cdot 7 H_2O$ | $<10^7$ |
| 4.10 | $MgCl_2$ | $<10^7$ |
| 4.11 | Mg phosphate | $4 \cdot 10^8$ |

What is claimed is:

1. An electrostatically applicable coating powder, which comprises a first powder which forms a glass layer upon firing, and 0.01 to 1% by weight of a salt of a carboxylic acid, wherein said coating powder is free of organosiloxane.

2. The electrostatically applicable coating powder according to claim 1, wherein the salt is an alkali metal, alkaline earth metal or earth metal cation.

3. The electrostatically applicable coating powder according to claim 2, wherein the cation is $Li^+$, $Na^+$, $K^+$, $Mg^{2+}$, $Ca^{2+}$ or $Al^{3+}$.

4. The electrostatically applicable coating powder according to claim 1, wherein the carboxylic acid is an aliphatic or aromatic carboxylic acid.

5. The electrostatically applicable coating powder according to claim 4, wherein the carboxylic acid is a monocarboxylic acid having 2 to 6 carbon atoms.

6. The electrostatically applicable coating powder according to claim 5, wherein the monocarboxylic acid is acetic acid or proprionic acid.

7. The electrostatically applicable coating powder according to claim 1, which comprises 0.05 to 0.5% by weight of the salt of the carboxylic acid.

8. The electrostatically applicable coating powder according to claim 1, wherein the first powder comprises a glass frit.

9. The electrostatically applicable coating powder according to claim 1, wherein the first powder comprises a mixture of different glass frits.

10. The electrostatically applicable coating powder according to claim 1, wherein the first powder comprises 30 to 100% by weight of glass frit.

11. The electrostatically applicable coating powder according to claim 1, wherein the first powder has a distribution of particle size with a $d_{90}$ value of less than 35 μm, a $d_{50}$ value in a range of 5 to 25 μm, and a $d_{10}$ value greater than 1 μm.

12. The electrostatically applicable coating powder according to claim 1, which further comprises a second powder comprising a chemically or thermally activatable resin.

13. The electrostatically applicable coating powder according to claim 12, wherein the coating powder contains 1 to 10% by weight of the chemically or thermally activatable resin.

14. The electrostatically applicable coating powder according to claim 1, which further comprises at least one member selected from the group consisting of alum earth, wollastonite, zirconium silicate, pigment, raw ceramic substances, ground minerals, glass powder, porcelain powder, opacifying agent, and pyrogenic oxide.

15. A process for producing an electrostatically applicable coating powder, which comprises contacting a first powder which forms a glass layer upon firing with an aqueous solution comprising 0.01 to 1% by weight of a salt of a carboxylic acid, and drying the first powder, wherein the coating powder is free of organosiloxane.

16. The process according to claim 15, wherein the salt is an alkali metal, alkaline earth metal or earth metal cation, the carboxylic acid is a monocarboxylic acid having 2 to 6 carbon atoms, the first powder comprises a glass frit or a mixture of different glass frits, and the first powder has a distribution of particle size with a $d_{90}$ value of less than 35 μm, a $d_{50}$ value in a range of 5 to 25 μm, and a $d_{10}$ value greater than 1 μm.

17. The process according to claim 15, which comprises additionally adding a second powder containing 1 to 10% by weight of the chemically or thermally activatable resin.

18. A process for producing an electrostatically applicable coating powder, which comprises mixing a first powder which forms a glass layer upon firing with 0.01 to 1% by weight of a salt of a carboxylic acid in a wet or dry state, and drying the first powder if necessary, wherein the coating powder is free of organosiloxane.

19. The process according to claim 18, wherein the salt is an alkali metal, alkaline earth metal or earth metal cation, the carboxylic acid is a monocarboxylic acid having 2 to 6 carbon atoms, the first powder comprises a glass frit or a mixture of different glass frits, and the first powder has a distribution of particle size with a $d_{90}$ value of less than 35 μm, a $d_{50}$ value in a range of 5 to 25 μm, and a $d_{10}$ value greater than 1 μm.

20. The process according to claim 18, which comprises additionally mixing a second powder containing 1 to 10% by weight of the chemically or thermally activatable resin.

21. A method for glazing, slip painting, decorating or enameling a substrate, comprising electrostatically applying the electrostatically applicable coating powder according to claim 10 onto a substrate selected from the group consisting of glass, ceramic and metallic substrates to obtain a coated substrate, and firing the coated substrate.

22. The process according to claim 21, wherein the salt is an alkali metal, alkaline earth metal or earth metal cation, the carboxylic acid is a monocarboxylic acid having 2 to 6 carbon atoms, the first powder comprises a glass frit or a mixture of different glass frits, and the first powder has a distribution of particle size with a $d_{90}$ value of less than 35 μm, a $d_{50}$ value in a range of 5 to 25 μm, and a $d_{10}$ value greater than 1 μm.

23. The process according to claim 21, wherein the coating powder further comprises a second powder containing 1 to 10% by weight of the chemically or thermally activatable resin.

* * * * *